Oct. 7, 1969  E. T. PEARSON  3,471,236
PRISM FOR OPTICAL STROBOSCOPE
Filed March 30, 1964
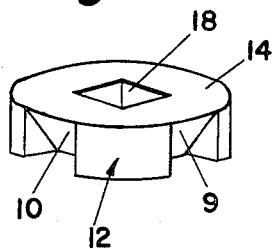
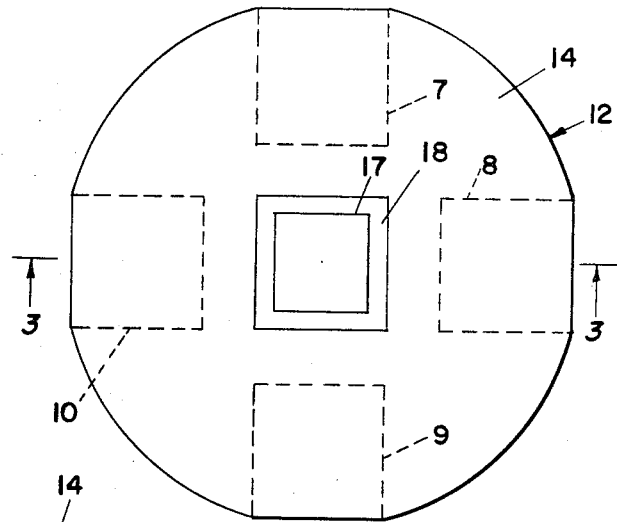
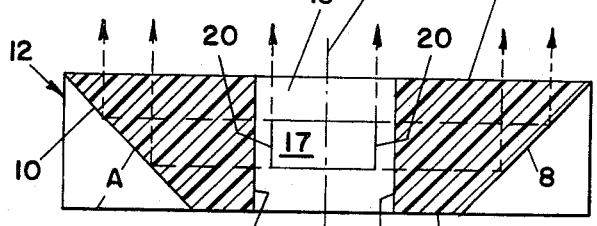
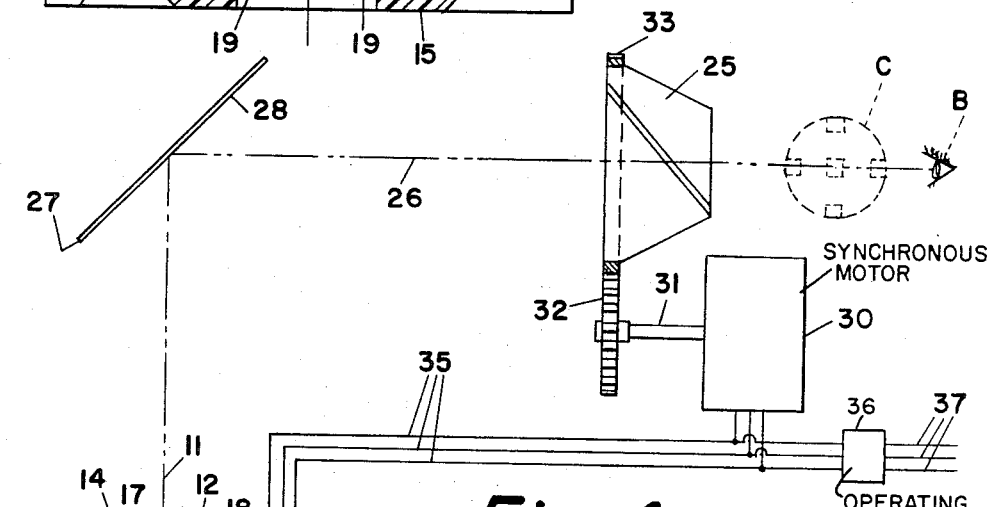
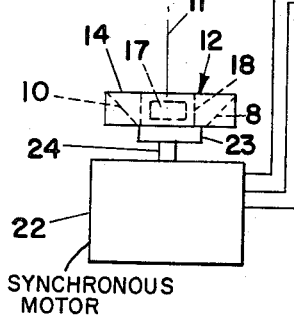
INVENTOR.
EARL T. PEARSON
BY Harry M. Saragovitz,
Edward J. Kelly, Herbert Berl, &
S. Dubroff
ATTORNEYS

United States Patent Office 3,471,236
Patented Oct. 7, 1969

3,471,236
PRISM FOR OPTICAL STROBOSCOPE
Earl T. Pearson, La Paz, Bolivia, assignor to the United States of America as represented by the Secretary of the Army
Filed Mar. 30, 1964, Ser. No. 355,972
Int. Cl. G01p *3/40*
U.S. Cl. 356—24                    2 Claims

ABSTRACT OF THE DISCLOSURE

A stroboscope system for viewing a rotating object, with the images of the sides reflected into a common viewing plane with one end thereof about an axis of rotation normal to said plane, through the medium of a unitary optical prism structure. This is provided by a single block of optical glass of circular configuration with a flat face in parallel relation to said plane and having a central well or opening therein for the reception of an object to be test rotated therewith about said axis. A plurality of flat optical light-reflecting surfaces are provided in the block and are all of substantially the same size and angular relation to said face in circular formation about said well and substantially equally spaced from the axis of rotation. The composite image of the object thereby provided is viewed through a Pechan prism or like device rotated synchronously with the prism structure and object.

---

The invention described herein may be manufactured and used by or for the Government for governmental purposes without the payment to me of any royalty thereon.

The present invention relates to stroboscopes for viewing spinning or rotating objects. Such devices generally provide a view from one direction and of one aspect or surface of an object, which appears to be stationary. Generally also, this effect is provided by stroboscopic illumination of the object with shuttered or pulsed light from a suitable source in proper timed relation to the speed of rotation of the object. The object is thus viewed at only one point in its rotational movement and on only one face or surface along the line of sight or optical axis provided for an observer.

Stroboscopes of the intermittent or pulsed-illumination type also have operational limitations with respect to the speed at which the object may be rotated. While applicable thereto, the present invention relates more particularly to a stroboscope for permitting the examination of an object rotating on a fixed axis at any speed, however high, and as a continuous and stationary image through the effective use of a "derotating" type of optical prism.

A stroboscope of this type is of the optical rather than the pulsed-illumination type, and includes a derotating optical prism in the line of sight or optical axis between the observer and the rotating object. This may be any optical device of this type such as a Pechan prism. By rotating the derotating prism at a speed related to the speed of rotation of the object, the rotating object may be observed as a stationary continuous image, rather than an instantaneous and limited one.

It is an object of this invention to provide an improved optical system for a stroboscope which permits the simultaneous viewing of a plurality of surfaces or faces of a spinning or rotating object along one line of slight or optical axis.

It is also an object of this invention to provide an improved optical system for a stroboscope which permits the simultaneous viewing of all sides of a cube or like object which are in planes parallel to the observer's line of sight or optical axis, together with and in proper relation to one end or face thereof.

It is a further object of this invention to provide an improved optical system of the type referred to which is adapted to be used with an optical stroboscope of the derotating-prism type and enables an observer to see a stationary continuous image of the near face and the sides of a spinning object in one view.

It is a still further object of this invention to provide an improved optical system of the type referred to having a unitary multiple-element prism structure adapted as a spin mount for an object to be observed in operation about its spin axis.

In accordance with one form of the invention, a multi-sided mirror is positioned to reflect the images of the sides of an object into a common viewing plane with one end thereof about an axis of rotation normal to said plane. This multiple view is derotated, to provide a continuous stationary view, by the system referred to. In some embodiments of the invention, the mirror surfaces may be replaced by the flat reflecting surfaces of optical prisms which may be included in one prism unit ground out of a single block of optical glass. A central axially-extending well or opening is provided to receive and hold the object to be viewed which thus rotates therewith. The sides of the well or opening are parallel to the planes or sides of the object to be viewed.

Thus when used with pulsed light at lower speeds, and at any speed with a derotating device in the system referred to, the prism mount and system improvement of the present invention enables an observer to see a continuous stationary image of the near end and sides of a rotating object in one view. To thus view the object under its normal operating conditions, it is rotated at its normal operating speed. With a unitary prism structure as the holding means for rotation of the object, the prism face is viewed through the optical stroboscope and all sides and the end appear stationary and are viewable continuously and simultaneously from one observation point.

The invention will, however, be further understood from the following description of an embodiment thereof when considered with reference to the accompanying drawing.

In the drawing:

FIG. 1 is a view, in perspective, of a multiple element prism structure or prism in accordance with the invention for use in a stroboscope system of the type referred to;

FIG. 2 is an enlarged top or plan view of the prism of FIG. 1 showing an object to be viewed positioned therein;

FIG. 3 is a cross-sectional view, in elevation, of the prism as shown in FIG. 2, taken on the section line 3—3 thereof, and FIG. 4 is a schematic representation of an optical stroboscope provided with the improvement of the present invention in the form shown in the preceding figures.

Referring to the drawing, wherein like parts and elements throughout the various figures are designated by like reference characters, and referring particularly to FIGS. 1, 2 and 3, a unitary prism structure is shown with four equal flat mirror prisms reflecting surfaces 7, 8, 9 and 10 in equal angular spaced relation about the longitudinal axis 11 of a relatively-thick round block 12 of optical glass or like light-translating material. The prism structure is thus of circular configuration. It comprises basically four optical prisms ground out of one piece of optical glass with the flats or reflecting surfaces 7–10 all at an angle A with respect to a common plane, such as the flat or planar forward face 14 of the block or multiple element prism structure, and extending from straight edges at the surface or face inwardly and rearwardly of the block to the flat back surface 15, as shown more clearly in FIG. 3. Any number of prism elements may be provided. Four are shown by way of example as being best suited to a square object, such as a cube or rectangular-shaped body or object 17 which is to be viewed in rotation at its operating speed.

A central well or cavity 18 is provided as an opening in the face 14 of the block or prism structure 12 for receiving and holding the body or object to be tested and viewed. This has a number of flat sides or side walls 19 corresponding to those of the body. The latter are preferably adapted to stand in effectively parallel relation with the planes or sides 20 of the object or body 17 which is to be viewed, as indicated in FIGS. 2 and 3. These planes, in operation, are visible in the four reflecting areas 7, 8, 9 and 10 shown in FIG. 2 and representing the optical flats of the prism elements. The angle A in the present example is the same for all four flats and may be taken to be 45 degrees, and the reflection of the sides of the object 17 into a common plane with the end view thereof is indicated by the arrowed dash-and-dot lines in FIG. 3. The images or reflections of these sides and end are thus directed forwardly from the common plane of the prism surface or face 14 to suitable viewing means. This may be included in the strobscopic system used for stopping the rotation effect.

The four planes and the central end view of the object thus rotate about the longitudinal axis 11 of the prism structure of multi-element prism 12. When the prism face 14 is viewed through an optical stroboscope, all four planes and the end view appear stationary and can be viewed simultaneously and continuously from one observation point. The application of the invention to an optical stroboscope system as an improvement therein, is shown in FIG. 4 to which attention is directed, along with the preceding figures.

In FIG. 4 the prism structure 12 contains the body 17 to be rotated for test and viewing at its operating speed, and thus provides a mounting and driving means therefor. It is adapted for connection with a driving motor, such as a synchronous electric motor 22, by an attached hub element 23 which is seated on the motor shaft 24. In this arrangement the spin axis 11 of the prism is aligned with the axis of rotation of a derotating prism 25, such as a Pechan prism or the like, along an optical or line-of-sight axis 26. The axis 26 is changed in direction 90 degrees by a mirror 27 having a reflecting surface 28 set at a 45-degree angle to the axis 26 from the rotating object 17. The rotational axes of both prisms are coincidental and rotation is in the same direction for both and at relative speeds for effecting the derotation desired. In the present example the Pechan prism is rotated at a lower speed than the object in a step-down ratio of 2:1.

For this purpose, therefore, the Pechan prism may be driven by a second and like synchronous motor 30 having a shaft 31 coupled to drive the prism 25 through a step-down gearing comprising a driving gear 32 on the motor shaft meshing with a driven gear ring 33 in which the prism 25 is mounted to rotate about the axis 26. The motors are connected together through a circuit indicated by the leads 35, and through an operating switch 36 with a common power supply circuit 37, whereby they may operate in synchronism to drive the object and crystal structure in the speed ratio established by the gear train. With the motors operating, the prisms 12 and 25 are driven at speeds of $n$ and $n/2$, respectively, in like directions. A viewer at B on the optical axis or line of sight 26 through the prism 25, will see a continuous static image of the object and its four sides, as indicated in dotted outline at C. This results as the image or reflection of each side from the prism or mirror flats appears in the common plane of the prism face with the end view of the object, and are projected along the axis 26 to provide the complete picture at B.

In addition to the rotation of a derotating prism, such as the Pechan prism 25, for effecting a continuous image, the stroboscope thus further includes a second prism of the multi-element type positioned in relation to and rotating with the object, to give a continuous image of the sides as well as one end. This permits the viewing of all four sides of a cube, or similar object, which are in planes parallel to the observer's line of sight. When used with a derotating device in an optical stroboscope system, it enables the observer to see a continuous image of the face and sides of a spinning object.

An advantage in the form of the prism shown, instead of mirror surfaces, is that the flats or reflecting surfaces for the prism elements in the structure are ground into a solid block of optical glass or like material. It is thus better, and more rigid and effective structurally, to give clear images or reflections. Four mirrors, however, it will be seen, could provide complete coverage in the present example if attached to the body to rotate therewith and being of a width equal to the diameter or width of the body to be observed.

In the optical stroboscope system of FIG. 4, the Pechan prism structure 25 operates to provide a mirror or reverted image. The mirror surface 28 provides a first reversion which is re-reverted or restored to its original left and right orientation of elements about the vertical axis of the object being viewed as if facing the planar front surface 14 of the prism structure or block 12. By application of this improvement, all sides and one end of a device, test rotated at its operating speed, are thus clearly displayed and in proper perspective.

I claim:

1. A stroboscope for viewing rotating multi-sided objects comprising:

a circular rotary prism unit of optical glass having first and second parallel faces and a central well therein formed by a flat transparent wall portion disposed at right angles to said first and second faces, said well extending along an axis of rotation of said unit from said first face to said second face for holding a multi-sided object placed therein;

a plurality of like planar reflecting surfaces in spaced angular relation to each other about said central well and positioned between said faces at substantially the same angle for simultaneously reflecting the image of each respective side of said object into a common viewing plane with one end thereof as a multiple view about said axis of rotation normal to said viewing plane and said faces;

stroboscopic means for rendering said multiple view stationary for observation thereof along an optical axis; and synchronizing means coupling said prism unit and said stroboscopic means for enabling the stationary observation of said multiple view along said optical axis extending from said axis of rotation.

2. A stroboscope for viewing rotating multi-sided objects as defined in claim 1, wherein said stroboscopic means includes a derotating prism positioned in and along said optical axis for rotation thereon at a speed having a predetermined relation to the speed of said prism unit and object, and wherein said synchronizing means includes a pair of synchronous electric driving motors, one in connection with each of said prisms, and a common power supply source connected to each of said motors for maintaining said speed relation to provide a stationary view of said object.

References Cited

UNITED STATES PATENTS

| | | | |
|---|---|---|---|
| 261,250 | 7/1882 | Ockelmann | 350—305 X |
| 610,918 | 9/1898 | Prewitt | 350—305 |
| 1,945,072 | 1/1934 | Quigley. | |
| 2,109,586 | 3/1938 | Einbinder | 350—299 |
| 2,117,635 | 5/1938 | Sprague | 350—299 X |
| 2,454,959 | 11/1948 | Barnes. | |
| 3,073,210 | 1/1963 | Packard | 350—112 X |
| 3,187,629 | 5/1965 | Rowell | 350—305 X |
| 2,506,764 | 5/1950 | Bach | 88—1.5 |
| 2,703,743 | 3/1955 | Harwood | 350—301 X |
| 3,399,592 | 9/1968 | Brachvogel et al. | 88—14 |

RONALD L. WIBERT, Primary Examiner

F. L. EVANS, Assistant Examiner

U.S. Cl. X.R.

350—286, 299